Figure 1:
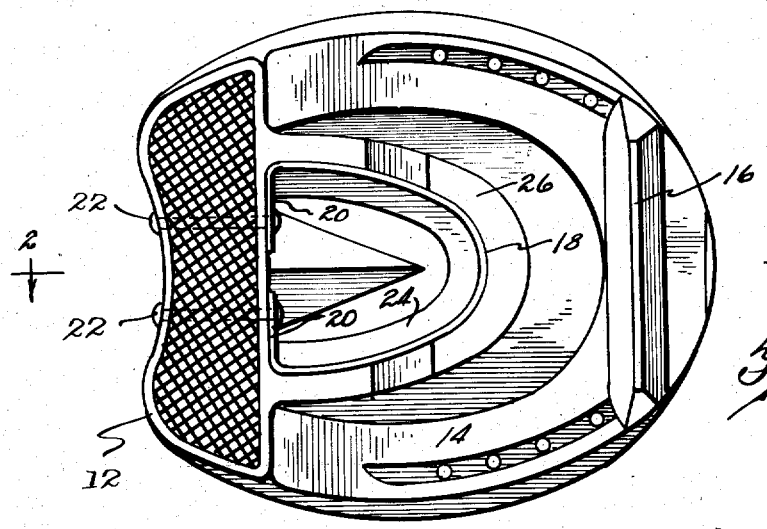

June 30, 1925. Re. 16,104

G. J. HEYMOSS, JR

HORSESHOE PAD

Original Filed April 7, 1924

INVENTOR.
George J. Heymoss, Jr.

BY
Parker and Burton
ATTORNEY.

Reissued June 30, 1925. Re. 16,104

UNITED STATES PATENT OFFICE.

GEORGE J. HEYMOSS, JR., OF DETROIT, MICHIGAN.

HORSESHOE PAD.

Original No. 1,496,414, dated June 3, 1924, Serial No. 704,564, filed April 7, 1924. Application for reissue filed December 1, 1924. Serial No. 753,389.

*To all whom it may concern:*

Be it known that I, GEORGE J. HEYMOSS, Jr., a citizen of the United States, residing at Detroit, county of Wayne, State of Michigan, have invented a certain new and useful Improvement in Horseshoe Pads, and declare the following to be a full, clear, and exact description of the same, such as will enable others skilled in the art to which it pertains to make and use the same, reference being had to the accompanying drawings, which form a part of this specification.

My invention relates to an improved horseshoe pad.

The object of my invention is to provide in combination with a horseshoe a suitable pad therefor having a heel portion and a marginal horseshoe supporting portion and a ground-engaging member preferably in the form of a plate set on edge within the horseshoe forwardly of the heel portion of the pad and yieldably supported to project to a greater height than the horseshoe carried by the pad.

An important object is to provide a horseshoe pad adapted to serve as a cushion for the horseshoe supported thereon, which pad is provided with a ground-gripping metal member set on edge and extending forwardly from the heel portion of the pad interior the horseshoe carried by the pad, which member is securely fastened to the pad and is adapted to first engage the ground.

An important feature is the provision of a horseshoe pad of cushioning material having a heel portion and a marginal horseshoe supporting portion and provided with a metal plate set on edge extending forwardly from the heel portion to form a loop within the horseshoe supported by the pad, which loop projects from the pad to a greater height than the horseshoe supported thereby.

Other objects and meritorious advantages of my invention will more fully appear from the following specification descriptive of the embodiment illustrated in the accompanying drawing and defined in the appended claims.

Figure 2:
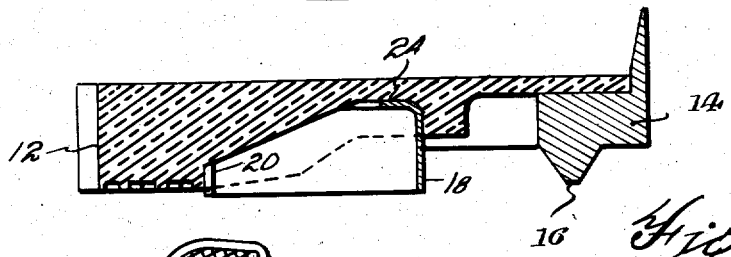
Figure 3:
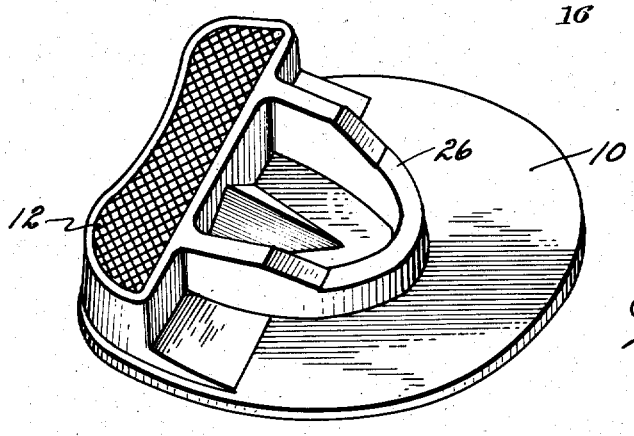

In the drawings:

Fig. 1 is a plan of my improved horseshoe pad and a horseshoe supported thereon, Fig. 2 is a sectional view taken on line 2—2 of Fig. 1, and Fig. 3 is a perspective of the horseshoe pad with the metal portion removed.

My improved horseshoe pad is built of suitable cushioning material, such as rubber, and comprises a substantially flat marginal portion 10 and a heel portion 12. The marginal portion is adapted to support a horseshoe 14 which is shown as having a toe calk 16. It will be noted that the heel portion of the pad normally projects to a greater height than the body of the horseshoe supported by the pad. The heel portion is shown as having a roughened ground-engaging surface suitable to prevent slipping of the pad on the pavement.

A pad structure of this general character is old. My improved pad, however, is provided with a metal plate 18 which is set on edge and which extends forwardly from the heel portion of the pad to form a loop disposed within the horseshoe carried by the pad. This loop is here shown as being of the same general shape as the horseshoe but considerably smaller, and the ends 20 of the plate may be secured to the heel portion of the pad by rivets 22. The plate is shown as provided with a base flange 24 which rests upon a surface of the pad.

The plate is set on edge and projects from the pad to a height greater than the horseshoe carried by the pad, so that in use this plate first engages the ground.

There is a ledge 26 of integral structure with the pad which extends forwardly from the heel portion of the pad to snugly embrace the metal plate 18, the plate being set within the recess formed between this ledge and the heel portion of the pad. In use the plate 18 is yieldably supported to first engage the ground, and the combined shoe structure has superior merit in preventing slipping upon the pavement.

What I claim is:

1. The combination with a horseshoe, of a horseshoe pad of cushioning material having a substantially flat marginal portion adapted to support the horseshoe, an integral heel portion of normally greater height than the horseshoe supported by the pad, a metal plate carried by the pad, said plate being set on edge and extended forwardly from the heel portion of the pad within the horseshoe carried thereby to form a loop of substantially the same shape as the horseshoe but considerably smaller, said plate projecting from the pad to a greater height than the horseshoe carried by the pad.

2. The combination with a horseshoe, of a horseshoe pad of cushioning material having a marginal horseshoe supporting portion, a heel portion, a metal plate set on edge secured to the pad extending forwardly from the heel portion thereof to form a loop interior the horseshoe supported by the pad, said plate projecting from the pad to a greater height than the horseshoe supported by the pad.

3. The combination with a horseshoe, of a horseshoe pad of cushioning material having a marginal horseshoe supporting portion, a heel portion, a metal plate set on edge secured to the pad extending forwardly from the heel portion thereof to form a loop interior the horseshoe supported by the pad, said plate projecting from the pad to a greater height than the horseshoe supported by the pad, and a ledge of unitary structure with the heel portion extending forwardly therefrom to closely embrace the metal plate.

4. The combination with a horseshoe, of a rubber horseshoe pad having a substantially flat marginal horseshoe supporting portion, a heel portion of normally greater height than the horseshoe supported by the pad, a metal plate secured to the pad having its ends secured to the heel portion of the pad, said plate set on edge and extending forwardly from the heel portion of the pad to form a relatively small loop within the horseshoe supported by the pad and projecting from the pad to a greater height than said horseshoe, said pad having a ledge integral with the heel portion extending forwardly therefrom and closely surrounding the metal plate.

5. The combination with a horseshoe, of a horseshoe pad of cushioning material having a marginal portion adapted to support the horseshoe, a heel portion, a metal plate set on edge having its ends secured to said heel portion and extending forwardly therefrom to form a loop within the horseshoe supported by the pad, said plate projecting from the pad to a greater height than the horseshoe carried thereby and having a base flange resting on the pad.

6. In combination with a horseshoe having a toe calk, a horseshoe pad formed of cushioning material having a heel portion and a marginal horseshoe supporting portion and a ground-engaging member positioned forwardly of the heel portion of the pad within the horseshoe supported thereby, said horseshoe supported upon said marginal portion of the pad, said ground-engaging member projecting from the pad to a greater height than the toe calk of the horseshoe carried by the pad.

7. In combination with a horseshoe, a horseshoe pad formed of cushioning material having a heel portion and a marginal portion supporting the horseshoe, provided with a ground-engaging plate set on edge forwardly of the heel portion of the pad within the horseshoe carried thereby and projecting to a greater height therefrom than the horseshoe carried thereby.

8. In combination with a horseshoe having a toe calk, a horseshoe pad formed of cushioning material having an integral heel portion and a marginal horseshoe supporting portion, said horseshoe being supported on said marginal portion, said pad provided with a ground-engaging plate set on edge forwardly of the heel portion of the pad and extending transversely thereof within the horseshoe carried thereby and projecting from the pad to a greater height than the heel portion of the pad or the toe calk of the horseshoe carried by the pad to first impinge upon the ground.

9. In a combined horseshoe and pad therefor, said pad being of cushioning material and having a heel portion and a marginal horseshoe supporting portion, a horseshoe having a toe calk and being supported on the marginal portion of the pad and a ground-engaging member yieldably supported by the pad forwardly of the heel portion thereof and within the horseshoe carried thereby to project to a greater height from the pad than the heel portion thereof or the toe calk of the horseshoe carried thereby.

In testimony whereof, I sign this specification.

GEORGE J. HEYMOSS, Jr.